US010225471B2

(12) United States Patent
Poindexter, Jr.

(10) Patent No.: US 10,225,471 B2
(45) Date of Patent: Mar. 5, 2019

(54) SYSTEM AND METHOD FOR AUTONOMOUSLY RECORDING A VISUAL MEDIA

(71) Applicant: Kenneth L. Poindexter, Jr., Tampa, FL (US)

(72) Inventor: Kenneth L. Poindexter, Jr., Tampa, FL (US)

(*) Notice: Subject to any disclaimer, the term of this patent is extended or adjusted under 35 U.S.C. 154(b) by 98 days.

(21) Appl. No.: 15/186,437

(22) Filed: Jun. 18, 2016

(65) Prior Publication Data

US 2017/0272654 A1 Sep. 21, 2017

Related U.S. Application Data

(60) Provisional application No. 62/310,058, filed on Mar. 18, 2016.

(51) Int. Cl.
H04N 5/232 (2006.01)
H04N 5/262 (2006.01)
G06F 3/0484 (2013.01)

(52) U.S. Cl.
CPC ....... H04N 5/23245 (2013.01); G06F 3/0484 (2013.01); H04N 5/23216 (2013.01); H04N 5/23293 (2013.01); H04N 5/2621 (2013.01)

(58) Field of Classification Search
CPC ........... H04N 5/23293; H04N 5/23216; H04N 5/23245; H04N 1/00161; G06F 3/0484; G06F 3/04847; G06F 3/0482
See application file for complete search history.

(56) References Cited

U.S. PATENT DOCUMENTS

| 7,391,444 | B1* | 6/2008 | Nomura | H04N 5/272 |
| | | | | 348/222.1 |
| 8,351,979 | B2 | 1/2013 | Seguin et al. | |
| 8,428,453 | B1* | 4/2013 | Spiegel | H04N 5/23216 |
| | | | | 396/299 |
| 8,717,381 | B2* | 5/2014 | Hayward | G06T 3/0093 |
| | | | | 345/619 |
| 8,723,986 | B1 | 5/2014 | Merrill, Jr. | |
| 9,258,480 | B2* | 2/2016 | Ruben | H04N 5/23216 |
| 9,413,966 | B2* | 8/2016 | Chiu | H04N 5/23293 |
| 9,502,034 | B2* | 11/2016 | Kim | G06F 3/167 |
| 9,531,947 | B2* | 12/2016 | Hayward | G06T 3/0093 |
| 9,560,264 | B2* | 1/2017 | Marlin | H04N 5/23206 |
| 9,674,462 | B2* | 6/2017 | Lee | H04N 5/23293 |
| 9,871,962 | B2* | 1/2018 | Stricker | H04N 5/23216 |
| 2006/0098111 | A1* | 5/2006 | Goh | H04N 5/23245 |
| | | | | 348/333.05 |

(Continued)

Primary Examiner — John Villecco
(74) Attorney, Agent, or Firm — Ariel S. Bentolila; Bay Area IP Group, LLC

(57) ABSTRACT

A system and method for autonomously recording a visual media including a digital image sensor to capture a visual media; a display to present the visual media from the digital image sensor; a touch controller to identify at least one of a haptic contact engagement, haptic contact signal and haptic contact gesture detected on a single haptic zone or at least one of a multiple individual haptic zone on the display; and a visual media capture controller to alternately record the visual media as a photograph or video based upon the number of times or the method which haptic contact occurs on the screen display and toggle between the single haptic zone and multiple haptic zones.

17 Claims, 18 Drawing Sheets

(56) References Cited

U.S. PATENT DOCUMENTS

| | | | |
|---|---|---|---|
| 2007/0081740 A1* | 4/2007 | Ciudad | H04N 1/00286 382/276 |
| 2013/0215313 A1* | 8/2013 | Maeda | H04N 5/23216 348/333.02 |
| 2014/0078371 A1* | 3/2014 | Kinoshita | H04N 5/23206 348/333.02 |
| 2014/0195947 A1* | 7/2014 | Yang | G06F 3/0486 715/769 |
| 2014/0204244 A1* | 7/2014 | Choi | H04N 5/23222 348/231.99 |
| 2015/0172534 A1* | 6/2015 | Miyakawa | H04N 5/23216 348/222.1 |
| 2015/0242105 A1* | 8/2015 | Shin | H04N 5/232 715/765 |
| 2015/0242111 A1 | 8/2015 | Balakrishnan et al. | |
| 2015/0334291 A1* | 11/2015 | Cho | G06F 3/0488 348/222.1 |
| 2015/0350535 A1* | 12/2015 | Voss | H04N 5/23216 348/220.1 |
| 2015/0350555 A1* | 12/2015 | Nishi | H04N 5/23293 348/333.02 |
| 2016/0004378 A1* | 1/2016 | Voss | H04N 5/232 348/207.1 |
| 2016/0191790 A1* | 6/2016 | Wang | H04N 5/23216 348/333.01 |
| 2016/0241777 A1* | 8/2016 | Rav-Acha | H04N 5/23216 |
| 2016/0366344 A1* | 12/2016 | Pan | G06F 3/0482 |
| 2017/0034428 A1* | 2/2017 | Kwon | G06F 3/04817 |
| 2017/0257559 A1* | 9/2017 | Stricker | H04N 5/23216 |

\* cited by examiner

SYSTEM AND METHOD FOR AUTONOMOUSLY RECORDING A VISUAL MEDIA

CROSS-REFERENCE TO RELATED APPLICATIONS

The present Utility patent application claims priority benefit of the U.S. provisional application for patent Ser. No. 62/310,058 entitled "TAP & HOLD ANYWHERE ON A HANDHELD (MOBILE OR PORTABLE) DEVICE SCREEN IN ORDER TO RECORD A VIDEO OR TAKE A PHOTOGRAPHIC IMAGE" filed on 18 Mar. 2016 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to image recording. More particularly, certain embodiments of the invention relates to activating a recording on a mobile device.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. Methods and apparatus for initiating image capture on a hand-held device run or execute a software application upon computing device. The software application may be an operating system, a program, or the like. In such software, a user input or triggering event is required to invoke a function on the computing device 100. The user may be prompted to perturb the computing device to invoke the function.

By way of educational background, another aspect of the prior art generally useful to be aware of is that a portable handheld device enables a user to swipe his finger across a camera lens or tap the device to control call and voicemail commands. Different motions of the user (e.g., swiping a finger over the lens in a given direction or finger tapping the device a number of times) may translate into different commands.

By way of educational background, another aspect of the prior art generally useful to be aware of is that a content management application allows a user to activate a camera function by interacting with a scroll element.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
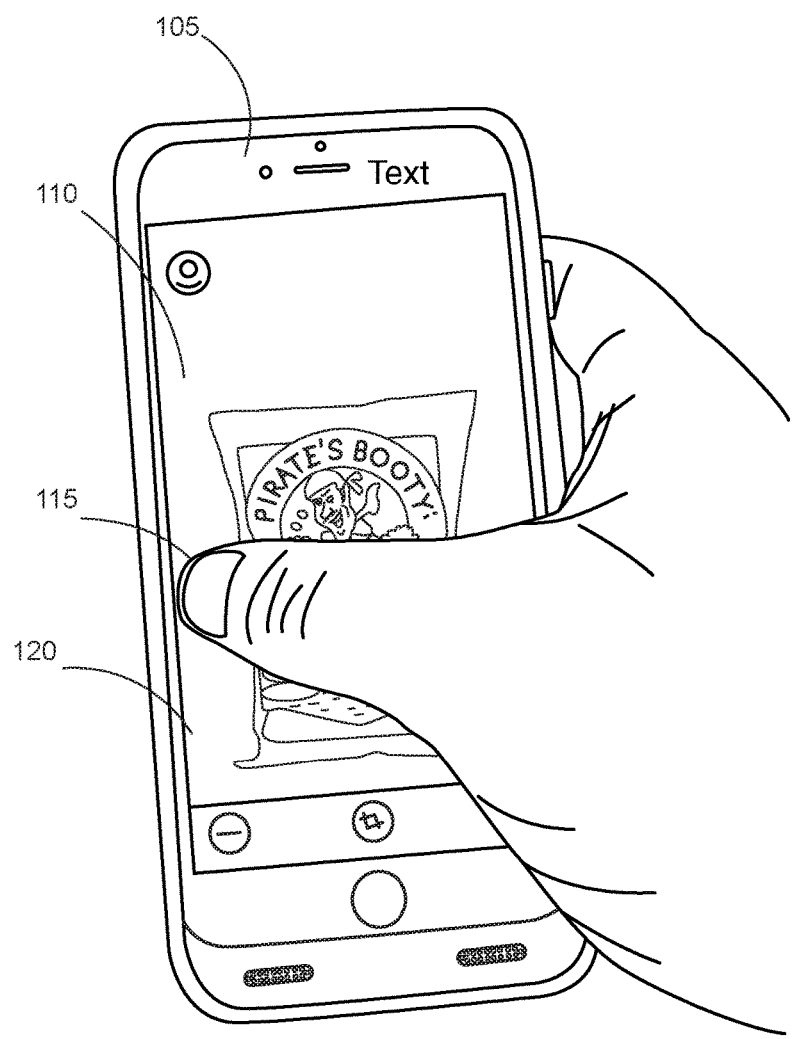
FIG. 1 illustrates an exemplary single haptic zone, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-insuit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other,"

"close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Many embodiments, and variations thereof, may allow a user to hold anywhere on a camera display screen (single haptic zone) in order to record a video on a mobile device. The mobile device may be any electronic device than may include: a digital image sensor to capture visual media; a display to present the visual media from the digital image sensors; a touch controller to identify haptic contact engagement, haptic contact signals and haptic contact gestures on the display; and a visual media capture controller to alternately record the visual media as a photograph or video based upon the number of times or the method which haptic contact occurs on the screen display. The digital image sensor may include, but not limited to, a digital camera, a smartphone camera, a mobile device camera, a tablet camera, a laptop computer camera, etc. The electronic device may be configured as, for example, but not limited to, a digital camera, a smartphone, a tablet, a laptop computer, a digital picture frame, a web camera, a digital watch screen, any apparel and wearable screens, a vehicle screen display, a billboard screen, advertising display screens, television display screens (LED, OLED, LCD, PLASMA, 4K Ultra HD), Flexible display screens, Waterproof curved LED display screens, digital indoor or outdoor LED display screen, a projector screen, multi touch table display screen, airport display board (screens), plasma poster display screens, retail LED display screen, 3D mobile display screens, Manufacturing & Equipment Display Screens, Marine Electronic Display Screen, Interactive Display Screen, New Media mobile exhibition display screen, Digital Wall Curtain Display Screen, Medical Device display screen, Radiology display screens, Patient Monitoring Screens, Surgical Imaging Screens, Wireless Surgical Imaging, mobile advertising digital display screen, touch screen kiosk display screen, a desktop computer, AV Video display screen, Music Audio & Video Equipment Display Screen, an eye retina screen display, a window, vehicle window screens, home window screens, airplane window screen, a mirror, a glass door, a glass table, machine display screen, appliance display screen, holograms, virtual reality, Head-mounted display, Broadcast reference monitor etc. In some embodiments, the visual media touch controller may rely on haptic zones, or transparent interconnected grid areas to control the functionality and or effects and filters of the camera. In some embodiments, an administrator of the haptic zone camera technology may have the ability to adjust the camera functionalities as well as set and require specified gestures or a series of gestures that would command a response within a specific haptic zone. In some embodiments, the visual media touch controller may rely on a single haptic zone input located within each device screen display. In some embodiments, the single haptic zone default functionalities may be photo and video. In other embodiments, other visual effects, filters and animation may have the ability to be applied as well. In some embodiments, the single haptic zone may convert into a multi-haptic zone display functionality once a photo or video capture mechanism has been activated by a user. The single haptic zone activation may occur when the user holds or presses their finger against the display screen (single haptic zone) in order to trigger a video recording functionality. In some embodiments, a user may activate the conversion of a single haptic zone to a multi-haptic zone when a user taps twice on the screen display (single haptic zone) in order to take a photographic image. In some embodiments, the activation may occur when a user taps the display screen once in which the user attempts to focus on a specific object. In some embodiments, the single haptic zone and the multi-haptic zone functionality toggles between one another in real-time. In some embodiments, the visual media capture controller may not have a single mode input icon on the display to receive the haptic contact engagement rather relies on an entire single haptic zone input, instead for haptic contact persistence and haptic content release. In some embodiments, the capture controller may rely on the number of times or the method of which haptic contact occurs to determine the actionable method of recording of the visual media such as, without limitation, a focus on an object, photograph or standard recorded video. In some embodiments, the visual media capture controller may selectively store the photograph in a photograph library. In some embodiments, the visual media capture controller may invoke a photograph preview mode. In some embodiments, the visual media capture controller may selectively store the video in a video library. In some embodiments, the visual media capture controller may invoke a video preview mode. In some embodiments, the user may have the ability to manipulate and customize the video or photo using visual effects or filters. In some embodiments, these filters and effects may be programmed into each haptic zone. In some embodiments, the visual media capture controller may store the photograph upon haptic contact engagement. In some embodiments, the visual media capture controller may include instructions executed by a processor. In some embodiments, the electronic device may further include a wireless signal processor, a power control circuit and a global positioning processor connected to the processor. In some embodiments, a non-transient computer readable storage medium may include executable instructions for: processing haptic contact signals from a display; focusing on an object based upon a first haptic contact signal; recording a photograph based upon a second haptic contact signal and; recording a video based on the user pressing or holding anywhere on the screen display in order to initiate or activate the video recording. In some embodiments, the electronic device may further include: sensor(s) including, but not limited to, gyroscope, accelerometer, proximity sensor, compass, audio & gesture sensors to identify device/image orientation, proximity & stability on the display; and an auto visual media capture controller to alternately record the visual media as a photograph or a video based upon change in orientation and/or change proximity and/or stability of device or image within particular period of time or based upon evolution of the time period between the change in orientation and/or change proximity and/or stability of device or image. In some embodiments, a mobile app may provide a screen size user interface touch controller of a personal communicator device that when held anywhere on the screen or single haptic zone the device would initiate and activate the video recording process. The user may be notified of this recording process by an illuminated colored border surrounding the screen when the process is activated by the user. In some embodiments, the mobile app may provide a screen size user interface touch controller of a personal communicator device that when touched quickly anywhere once on the screen or single haptic zone the device would focus the camera on the specified object. Many embodiments, and variations thereof, may allow a user to tap anywhere on the display screen once to focus on an image, twice anywhere on the screen to snap a photographic image. Many embodiments, and variations thereof, may allow a user to apply filters and effects in real-time or post recording by simply holding specific areas (multiple haptic zones) of the display screen during the recording process or post recording process. In a non-limiting example, a user may be able to record with different preset filters that are allocated to specific haptic zones. These zones may have different photo or video filters or effects and the user may be able to see these effects automatically applied to their video record or photographic image as they snap a photo or record a video. The user may be able to alter and change filters and effects live as a video is being recorded or post recording during the preview of the video recording. By tapping different haptic zones, the zone may be preset with filters, effects and animations that may allow the user to customize their real-time video recording. Some embodiments may allow users to assign visual filters and effects to specific haptic zones. Some embodiments may allow users to modify their real-time effects and filters post recording, on a user preview page. This page may be where users are able to modify or edit the image or video as well as apply any type of filters or effects they would like before posting the image or video recording. In some embodiments, when touched quickly anywhere twice on the camera display touch screen, the device may take a photographic snapshot through the device's image sensors and haptic zones. In some other embodiments, a different number of touches may be employed. In some embodiments, a photograph is taken upon haptic contact engagement and a timer is started and based upon an expired time the photograph is preserved. In some embodiments, when the screen size user interface is held anywhere on the camera display screen for at least two seconds, the video recording process may be activated. In other embodiments, the hold time may be more or less than two seconds. In some embodiments, the video recording may not complete until the user swipes their finger down on the user interface during the video recording session. In other embodiments, different swiping motions may be used, such as, but not limited to, a circular, arc, x etc. In some embodiments, the recording time may be limited. As a non-limiting example, a default time of 15 seconds may be used. In some embodiments, may receive an indication that time is beginning to elapse. In a non-limiting example, the user recorded video may blur and water animation w/transparent background featuring a "Company" logo may appear as time begins to elapse. In other embodiments, time may be unlimited or limited to available storage. In some embodiments, the screen size user interface may signal the video recording action by changing the color of the interface borders simultaneously as the video is being recorded. The colors may then be removed when the recording is complete. In some embodiments, real-time effects and filters may be assigned to a specific haptic zones which may allow users to alter video filter, sound, effects while video recording in real-time or post recording. Haptic zones may be defined as specified areas located on the touch screen camera interface programmed to respond to specific preset actions. In some embodiments, preset actions may change from one haptic zone to another in real-time during the recording process of a photo or video recording or post recording during the video or image preview. In some embodiments, these actions may be video, photo, audio effects, animations, gifs, filters, sounds, images, etc. In some embodiments, finger placement on the mobile device touch screen triggers an action located within a specific haptic zone. For example, without limitation, if a user has the bottom right hand corner preset to slow motion, anytime the users finger taps or holds the bottom right hand corner of the touch screen the video would respond in slow motion while the video itself is recording or taking a photograph. In some embodiments, the haptic zones may not be activated until a video or photo recording process takes place or after a recording has occurred. Haptic zone triggers may not function until a user is recording a video or until a user has recorded a video. In some embodiments, the order in which the haptic zones are played back once the video is viewed is dependent upon the order in which the user tapped the preset action(s) located in the specific haptic zones. In some embodiments, the user chooses to keep the video recording, the completed video recording session may be automatically uploaded to a server. In some embodiments, video recordings may be automatically saved in the users camera roll (Backup).

FIG. 1 illustrates an exemplary single haptic zone, in accordance with an embodiment of the present invention. In the present embodiment, an electronic device 105 may include a screen display 110 where the entire screen display 110, also known as the single haptic zone input, is the visual media capture controller. In the present embodiment, the visual media capture controller may receive a haptic contact engagement, haptic contact persistence and haptic content release. As shown in FIG. 1, a user 115 is holding the left side of screen display 110 in order to initiate a video recording. In the present embodiment, user 115 may hold any portion of screen display 110 to initiate the recording. In an alternative embodiment, a portion of screen display 110 may be reserved for other functions. During the recording, a solid colored border 120 may be displayed about screen display 110 to indicate the recording is in process. In some embodiments, colored border 120 may be a visually recognizable color such as, without limitation, red. In some alternate embodiments, colored border 120 may be a dashed border. In some other alternate embodiments, colored border 120 may periodically flash during the process. In some other alternate embodiments, a colored border may not be displayed and instead an icon of message may be displayed. In a non-limiting example, this method of initiating a recording may allow more flexibility for users who are reviewing products, services and events on the go, as well as taking pictures of friends and family on a vacation. It may offer users the ability to be more flexible when recording testimonials or "selfie's" without having to find a record button. In the present embodiment, the user may have the ability to touch anywhere on the screen in order to engage contact and take or snap a photographic image.

Figure 2:
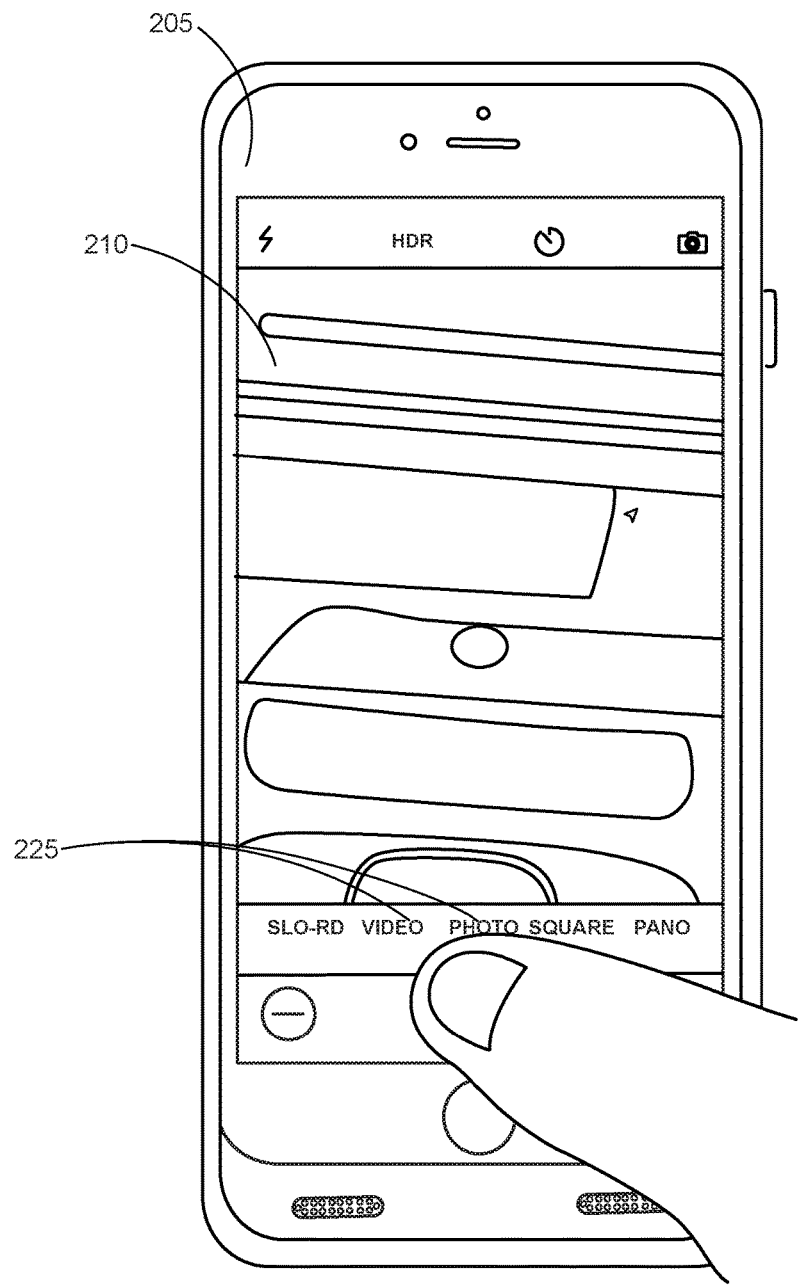
FIG. 2 illustrates a display, in accordance with the prior art.

FIG. 2 illustrates a display, in accordance with the prior art. In the prior art embodiment, an electronic device 205 may include a screen display that allows users to hold anywhere on the display to record a video or tap anywhere on the screen to take a photograph 210 that will not include input icons 225 to receive a haptic contact engagement for recording a video or snapping a picture.

Figure 3:
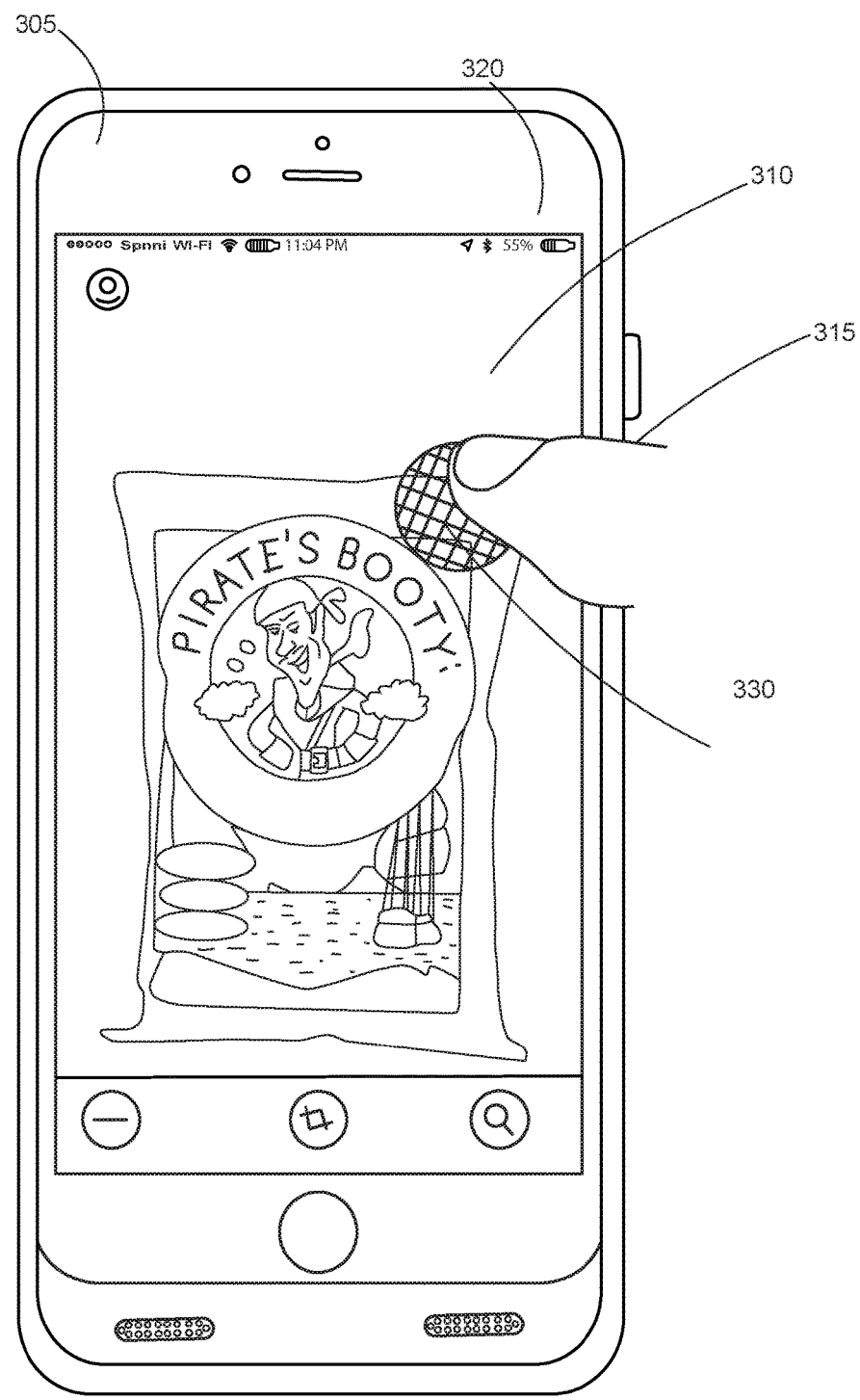
FIG. 3 illustrates an exemplary single haptic zone, in accordance with an embodiment of the present invention.
Figure 4:
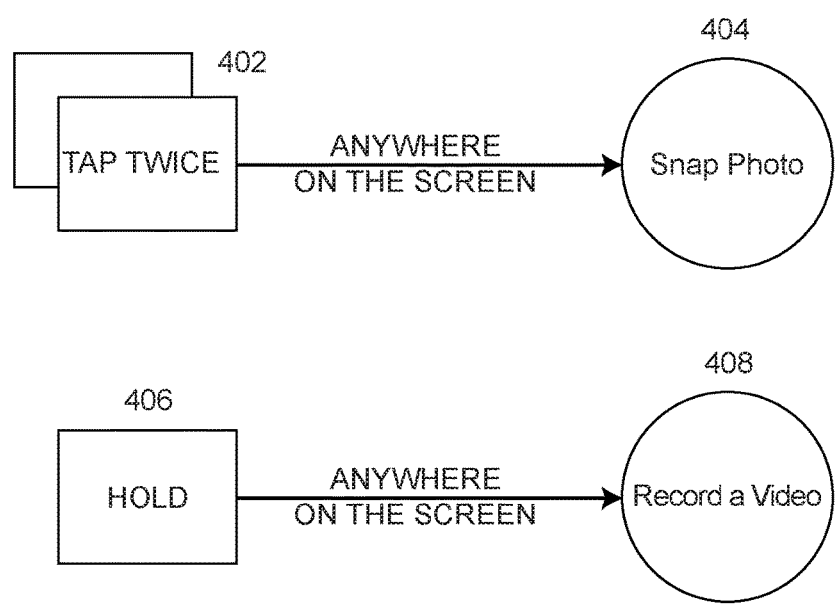
FIG. 4 illustrates an exemplary method for initiating a photograph and a video recording, in accordance with an embodiment of the present invention.

FIG. 3 illustrates an exemplary single haptic zone 305, in accordance with an embodiment of the present invention. In the present embodiment, the user 315 is holding a top right side 330 of screen display 310 in order to initiate a video recording. During the recording, a solid colored border 320 may be displayed about screen display 310 to indicate the recording is in process. FIG. 4 illustrates an exemplary method for initiating a photograph and a video recording, in accordance with an embodiment of the present invention. In the present embodiment, the user may tap twice 402 anywhere on screen display 110 to snap a photo 404. The user may also hold 406 anywhere on screen display 110 to record a video 408.

Figure 5:
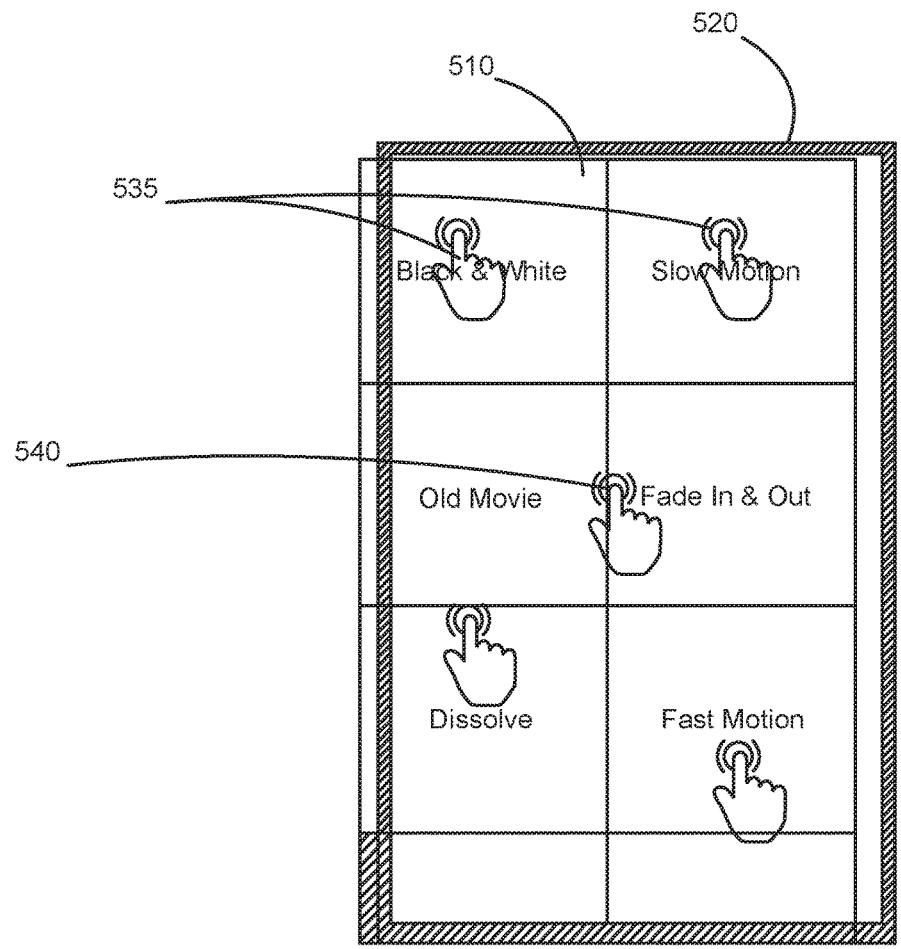
FIG. 5 illustrates an exemplary method for initiating a photograph or a video recording, in accordance with an embodiment of the present invention.

FIG. 5 illustrates an exemplary method for initiating a photograph or a video recording, in accordance with an embodiment of the present invention. In the present embodiment, a user may have the ability to hold anywhere on the screen display 510 in order to engage a video recording action by the camera. In the present embodiment, a user may have the ability to tap twice anywhere on the screen display 510 in order to snap a photo. In the present embodiment, the user may be able to record with different preset filters and effects that are programmed to specific haptic zones. These zones may have different photo or video filters or effects and the user would be able to see these effects automatically applied to their video recording or photographic image as they snap a photo or record a video. The user will be able to alter and change filters and effects in real-time as a video is being recorded. In the present embodiment, the user may select a single zone 535 to apply a single effect. In the present embodiment, the user may select multiple zones 540 by selecting a border between zones to apply multiple effects. The zones may be labeled, which would be available to be turned on/off by the user in the settings page. A user may select 2 zones or even 5 zones at the same time and apply 5 effects at the same time to a video recording or photo capture. This allows for user creativity.

Figure 6A:
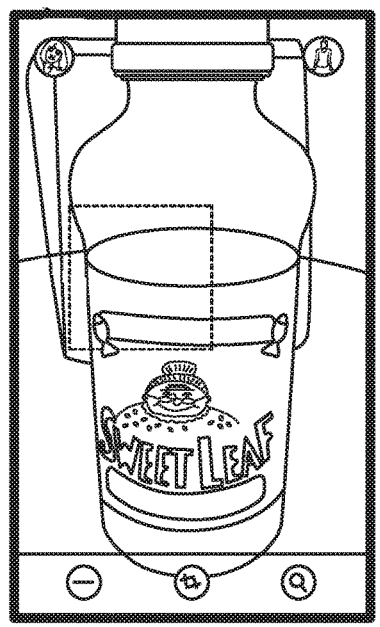
FIGS. 6A and 6B illustrates an exemplary method for initiating a video recording, in accordance with an embodiment of the present invention.
Figure 6B:
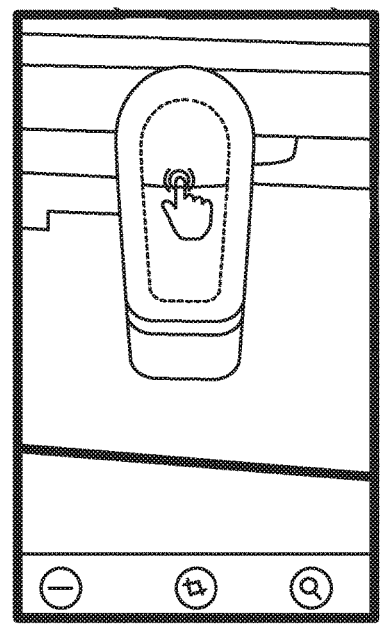

FIGS. 6A and 6B illustrates an exemplary method for initiating a video recording, in accordance with an embodiment of the present invention.

Figure 7:
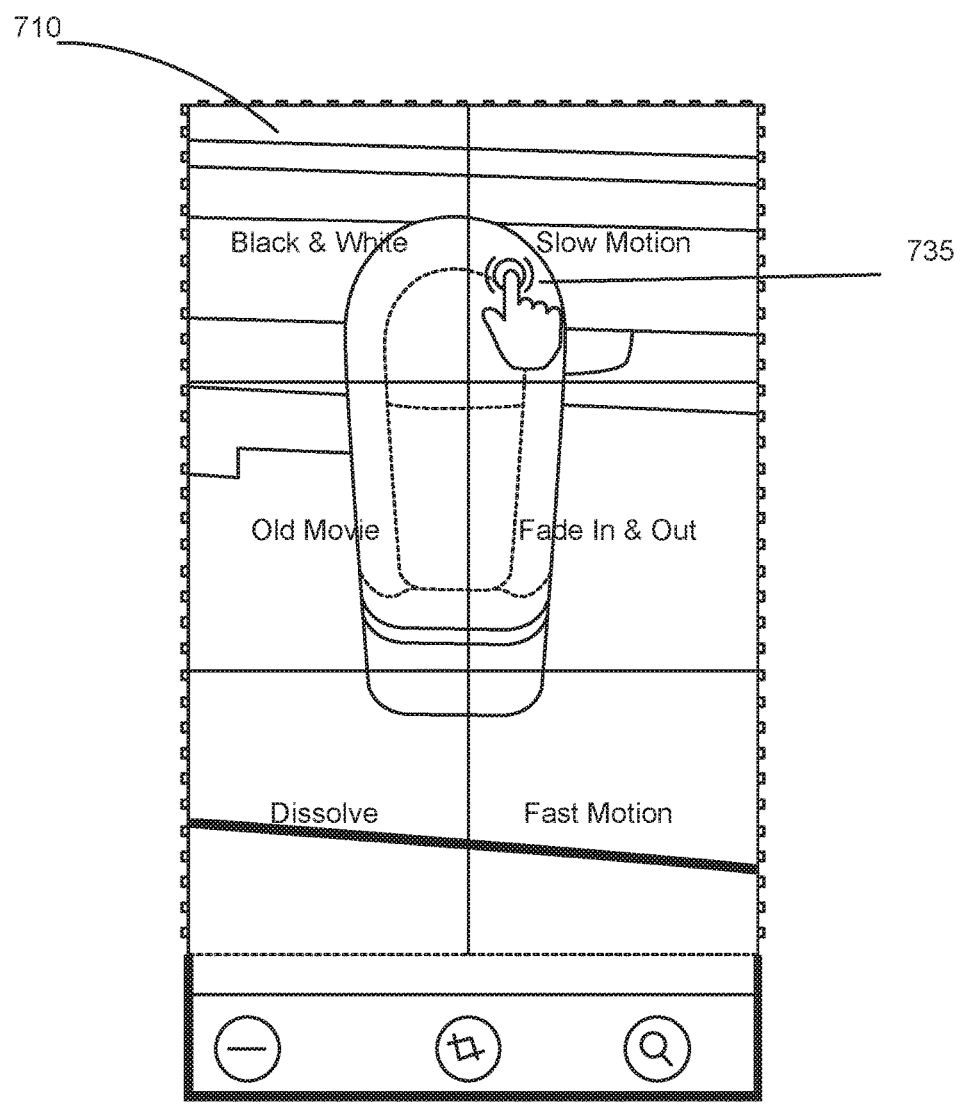
FIG. 7 illustrates an exemplary method for a photograph or a video recording, in accordance with an embodiment of the present invention.

FIG. 7 illustrates an exemplary method for a photograph or a video recording, in accordance with an embodiment of the present invention. In the present embodiment, a user may have the ability to hold a finger on a haptic zone 735 of a screen display 710 to add real-time effects and animations such a, without limitation Slow Motion to a video recording. The haptic zone grid may be turned on/off in the settings page, allowing the user to determine whether the grid remains on the screen. An image preview may be viewed in the settings page. In the present embodiment, the user may also have the ability to hold a finger on a haptic zone 735 of a screen display 710 post recording during the preview page. In the present embodiment, when the user releases their finger the "Action" or "Effect" may default back to a standard recording and save the previous action/effect. In some embodiments, this action may be repeated unlimited times based on the amount of activated haptic zones until the recording ends. In some embodiments, real-time effects may be recorded live, saved and have the ability to be modified post recording. A video image or a photographic image may not be saved automatically. The video or image with or without effects is not saved until the user approves the recording via the preview page. The preview page is where users will have the ability to modify the video or photo. In addition, the preview page allows for the user to have a final determination if the video or photo is final. Once saved the video or photo is then saved to the photo library or, alternatively, to a cloud based server.

Figure 8:
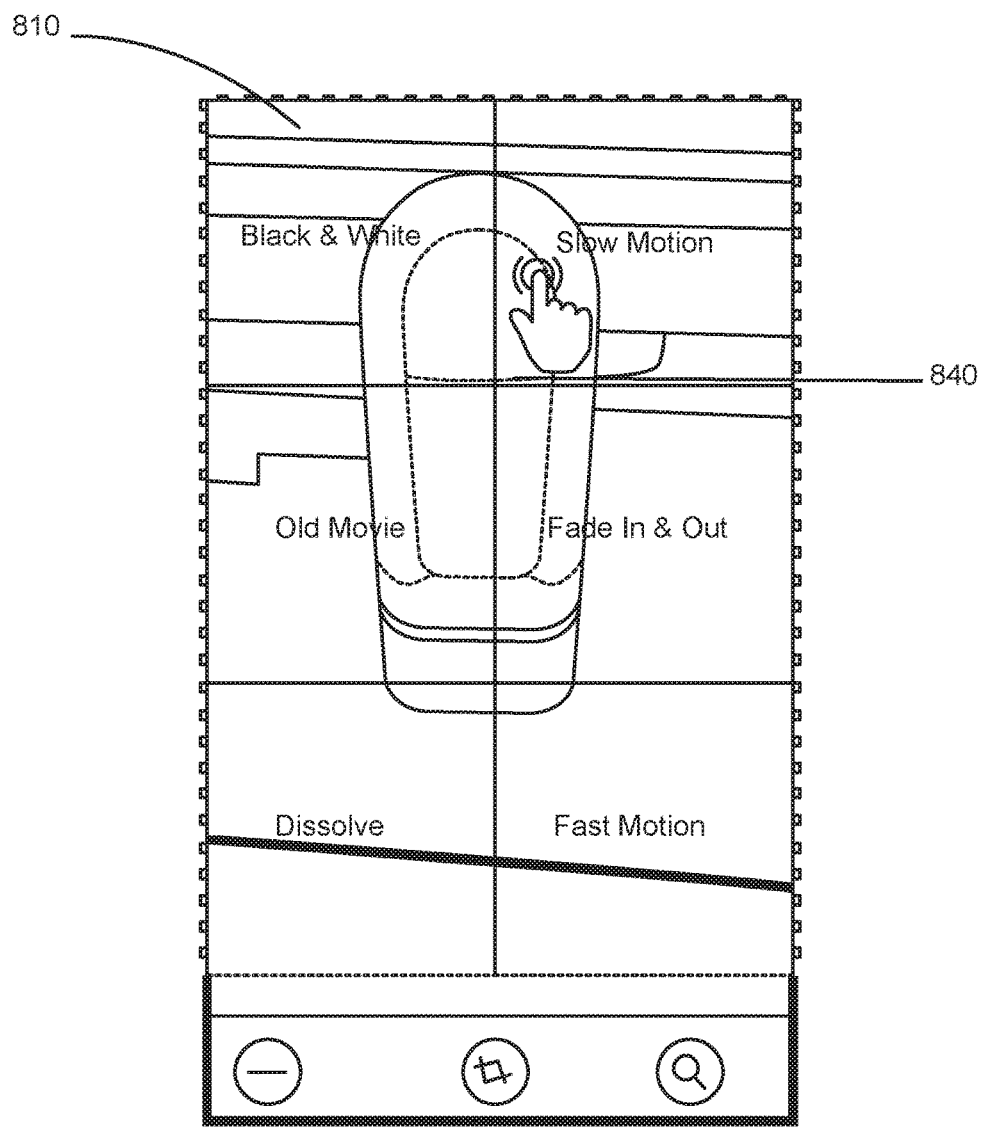
FIG. 8 illustrates an exemplary method for a zone mix effect for a photograph or a video recording, in accordance with an embodiment of the present invention.

FIG. 8 illustrates an exemplary method for a zone mix effect for a photograph or a video recording, in accordance with an embodiment of the present invention. In the present embodiment, a user may have the ability to hold a finger on junction of multiple haptic zones 840 of a screen display 810 to mix real-time effects and animations. In a non-limiting example a video may playback a black & white, slow motion, old movie style video that fades in and out.

Figure 9:
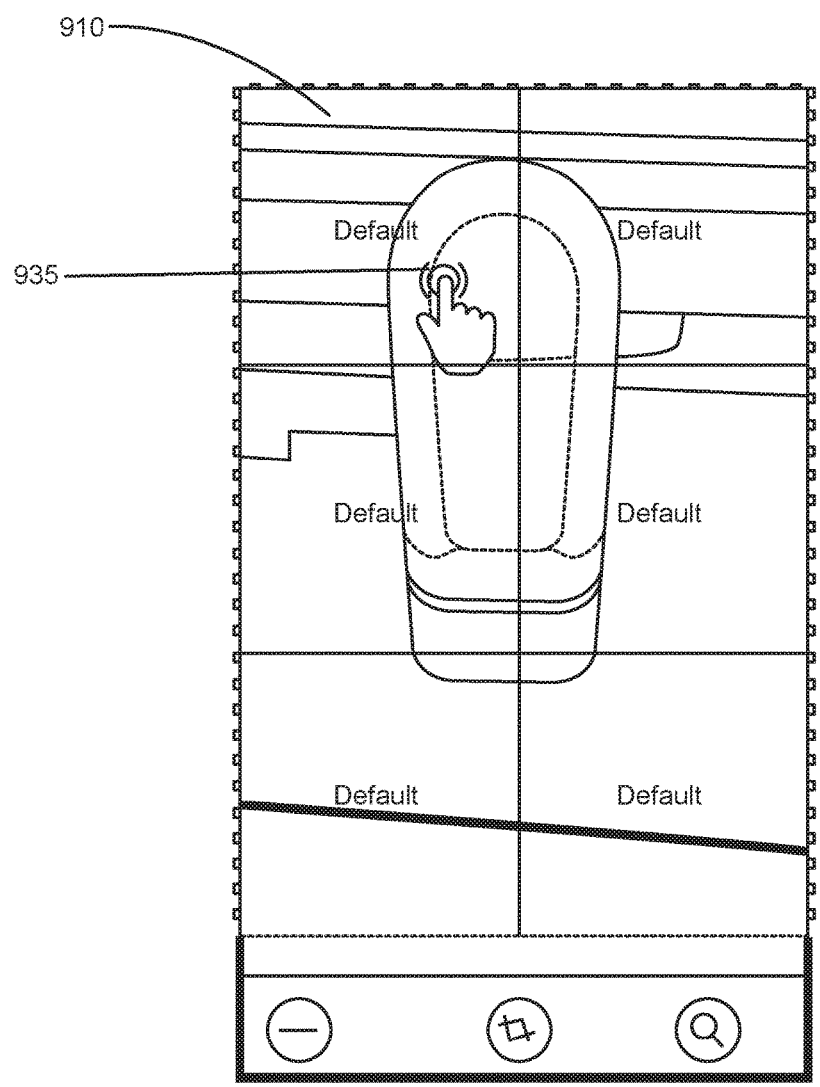
FIG. 9 illustrates an exemplary method for a photograph or a video recording, in accordance with an embodiment of the present invention.

FIG. 9 illustrates an exemplary method for a photograph or a video recording, in accordance with an embodiment of the present invention. In the present embodiment, a user may have the ability to hold a finger on a haptic zone 935 of a screen display 910 to record a photographic image.

Figure 10A:
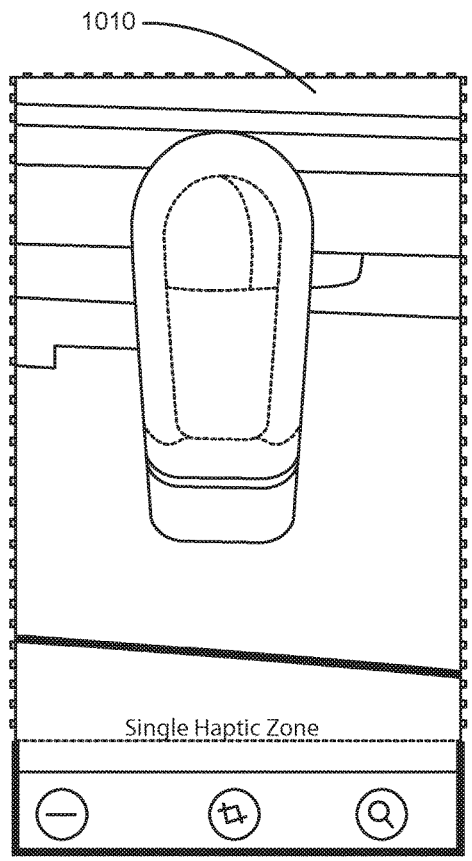
FIGS. 10A and 10B illustrate exemplary haptic zone displays, in accordance with an embodiment of the present invention.
Figure 10B:
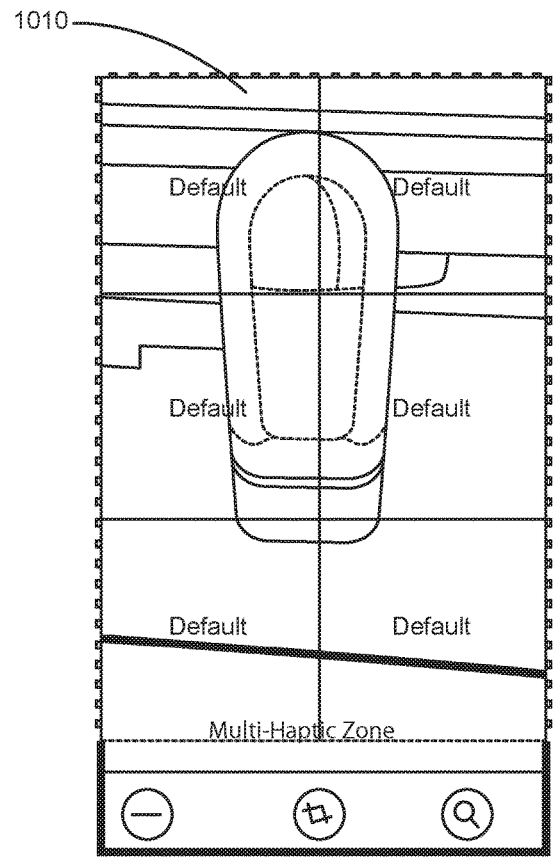

FIGS. 10A and 10B illustrate exemplary haptic zone displays, in accordance with an embodiment of the present invention. In the present embodiment, haptic zones may function as a single haptic zone or a multi-haptic zone display. In FIG. 10A a single haptic zone on screen display 1010 may occur when a user opens a camera or mobile application featuring a camera interface, the single haptic zone input is located on each electronic device screen 1010. In the present embodiment, the single haptic zone may be defaulted to toggle between photo and video functionalities only. In other embodiments, the default functionalities of the single haptic zone input and display may be altered. In FIG. 10B a multi-haptic zone on screen display 1010 may occur during the recording process of a photo or video recording or post recording during the video or image preview.

Figure 11:
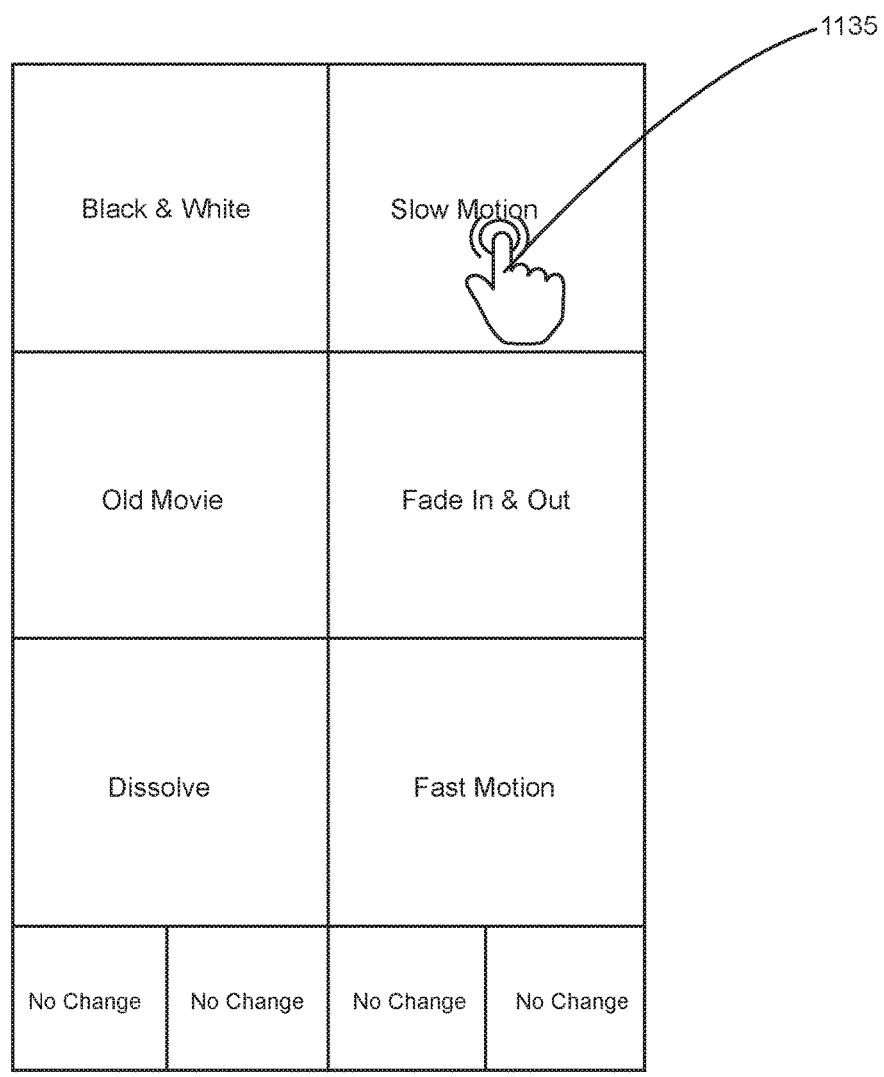
FIG. 11 illustrates an exemplary multi-haptic zone display, in accordance with an embodiment of the present invention.
Figure 12:
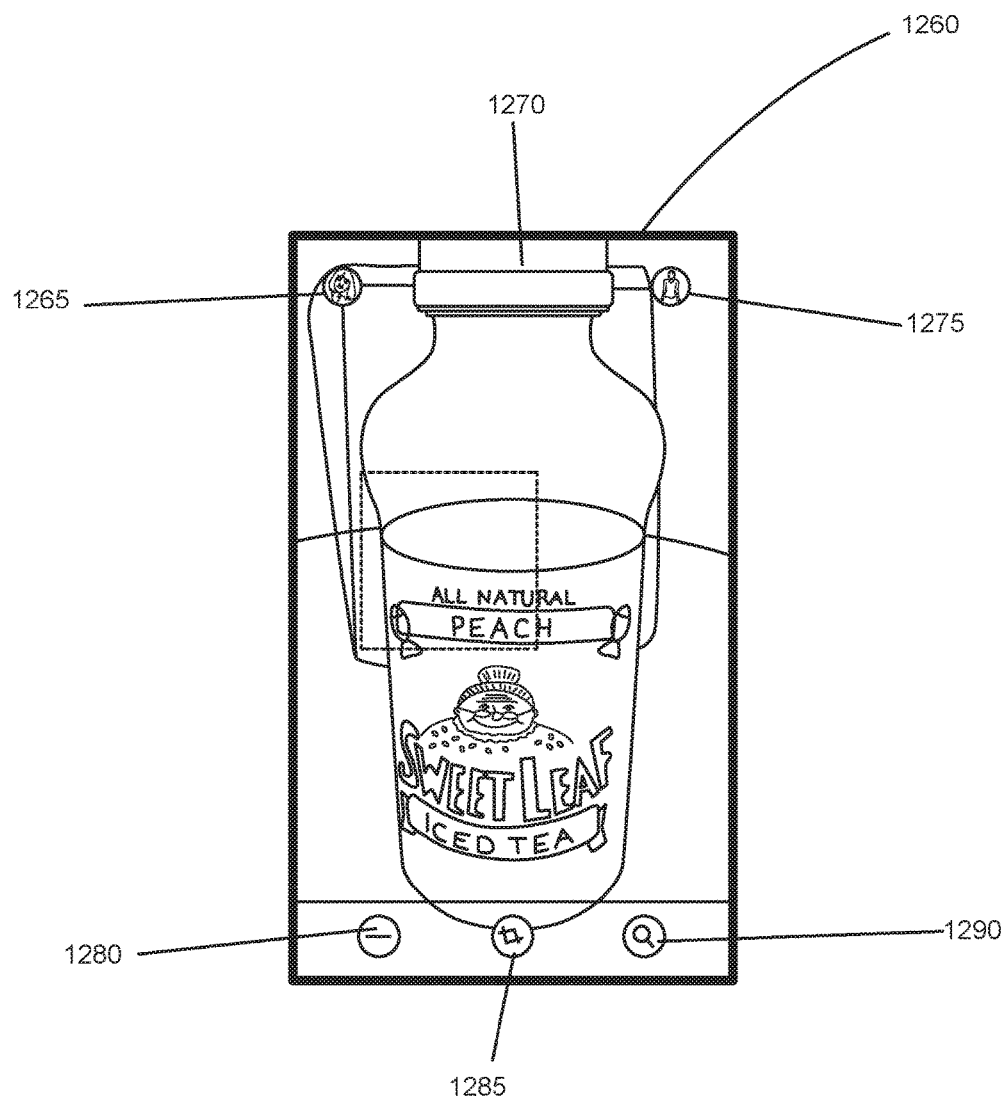
FIG. 12 illustrates an exemplary homepage, in accordance with an embodiment of the present invention.

FIG. 11 illustrates an exemplary multi-haptic zone display, in accordance with an embodiment of the present invention. In the present embodiment, when the user slides their finger from one preset zone 1135 to another the real-time effect or filter may change while the video is recording or while the video is being played back during the preview. In a non-limiting example, if a user has a top right hand corner preset to slow motion, anytime the user's finger holds the top right hand corner of the touch controller the video may respond in slow motion while the video itself is recording or taking a photograph. In the present embodiment, the haptic zones may not be activated until a video or photo recording process takes place or after a recording has occurred. Haptic zone triggers may not function until a user is recording a video or until a user has recorded a video. Haptic zones may be represented by micro squares or a grid located on the interface of the screen display. The squares may be set to allow user customization such as filters, effects such as, without limitation, slow motion video, standard, non-active (default), slow motion video, loop video, speed video record, music playing while video recording, etc. Any zone that is tapped, touched or held may trigger an action. In some embodiments, haptic zones may be manually adjusted according to user preferences. In some embodiments, the zones may be transparent as are the borders of the zones. Users not familiar with their preset zones could rely on the grid and effects to be illuminated, which is able to be turned on/off in the settings page. In some embodiments, zones may light up on the device like a grid allowing the user customization of each zone such as but not limited to selecting a specific effect, animation, gif or SFX FIG. 12 illustrates an exemplary homepage, in accordance with an embodiment of the present invention. In the present embodiment, a user may access a mobile application that may operate as an exemplary homepage 1260 combined with electronic device 105 to record an experience such as, without limitation, with a specific business listing. Typically, homepage 1260 may be a first page visible by the user. The homepage 1260 may be designed to be an action tool, prompting users to review as many business, products, services or events as possible. The homepage 1260 may offer a profile icon that may link the user to their profile page. A mobile application logo 1270 may link users to a featured review stream (Video/Photo/Live Stream) from around the world. The featured review streaming functionality may allow users to click on the "Mobile App" Logo and showcase all of the people who have upgraded by paying a fee to have their reviews featured throughout the mobile application or website. This featured page may operate to offer continues playback and looping of a playable stream of video, photo and audio reviews that have been selected to be featured. The user may then have the ability to end the playback of the featured review stream by swipe down using their finger(s) which removes the reviews and goes back to homepage 1260. A live icon 1275 may link users to the mobile application live review posting page. A dots icon 1280 may link the user to a contacts page which may also link the user to the profile page/settings page as well. A flip camera icon 1285, which may be referred to as "Selfie-Mode" or "Testimonial Mode", may allow the camera to flip the camera angle in order for the user to record a testimony of their experience with a specific business listing. A search icon 1290 may link the user to a business listing page/map page. The electronic device 105 may also have the ability to function as both a video recording camera and a standard camera enabling the user to record their experiences with a specific business listing and posting their experience for the world to view.

Figure 13:
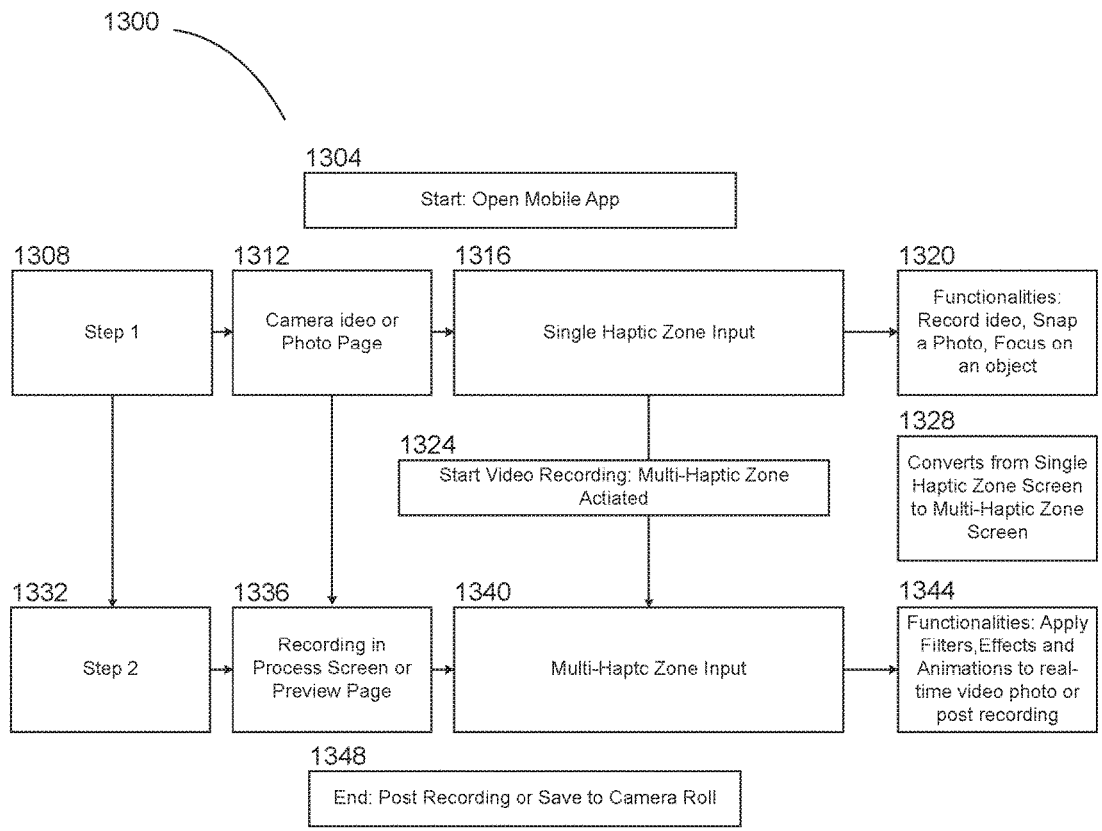
FIG. 13 illustrates an exemplary system functionality, in accordance with an embodiment of the present invention.

FIG. 13 illustrates an exemplary system functionality, in accordance with an embodiment of the present invention. In the present embodiment, the user may start or activate an application 1304 on electronic device 105. The user may then select to begin with step 1 1308 or step 2 1332. Starting with step 1 1308 a camera video or photo page 1312 may be displayed on electronic device 105. With camera video or photo page 1312 displayed, a single haptic zone input 1316 may be active. Functionalities 1320 of single haptic zone input 1316 may include, without limitation, record video, snap a photo, or focus on an object. When a recording is activated 1324, a display on electronic device 105 may convert 1328 from single haptic zone screen to multi-haptic zone screen. With multi-haptic zone input 1340 functionalities 1344 may include, without limitation, apply filters, effects and animations. With a step 2 1332, a recording may be process or a preview page displayed 1336. With recording in process or preview page 1336 multi-haptic zone input 1340 and functionalities 1344 may be active. In the present embodiment, the user may end the application 1348 by, without limitation, posting or saving a recording.

Figure 14:
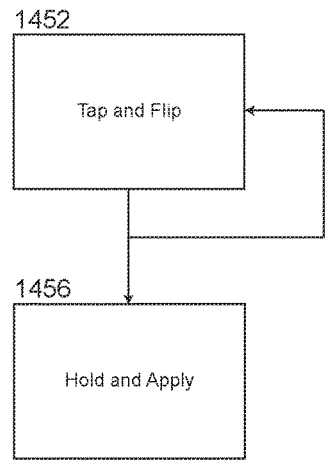
FIG. 14 illustrates an exemplary operation in a multi-haptic zone screen, in accordance with an embodiment of the present invention.

FIG. 14 illustrates an exemplary operation in a multi-haptic zone screen, in accordance with an embodiment of the present invention. In the present embodiment, the user may tap once 1452 on a desired zone of a multi-haptic zone screen to flip and change through pre-programmed filters and effects. The user may be able to place different filters in the different haptic zones by a single tap. In the present embodiment, the user may hold 1456 on a desired zone of a multi-haptic zone screen to apply the filter, animation or effect to the recording in real-time or post recorded video or photo. In other alternate embodiments, the user may use a tap and drag to move a filter to a different zone.

Figure 15:
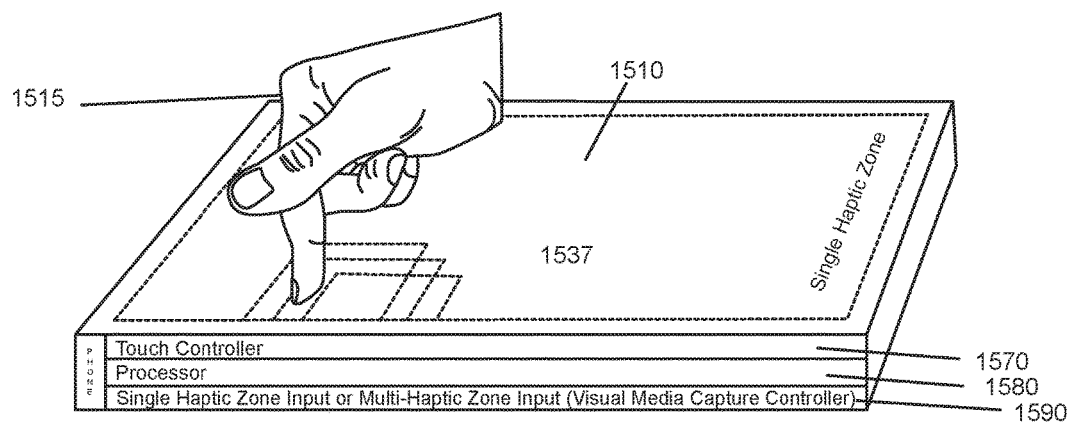
FIG. 15 illustrates an exemplary single haptic zone control, in accordance with an embodiment of the present invention.

FIG. 15 illustrates an exemplary single haptic zone control, in accordance with an embodiment of the present invention. In the present embodiment, screen display 1510 includes a single haptic zone. A user 1515 may engage screen display 1510 at location 1537. A touch controller 1570 may be configured with a transparent interconnected grid called haptic zones, these haptic zones. The haptic zones may have the ability for users to apply standard functionalities such as, but not limited to, simply record a video, snap a photo, or focus on an object. Other embodiments may provide for other functionalities. A touch controller 1570 may generate a haptic contact engagement signal for processing by a visual media capture controller 1590 in conjunction with a processor 1580.

Figure 16:
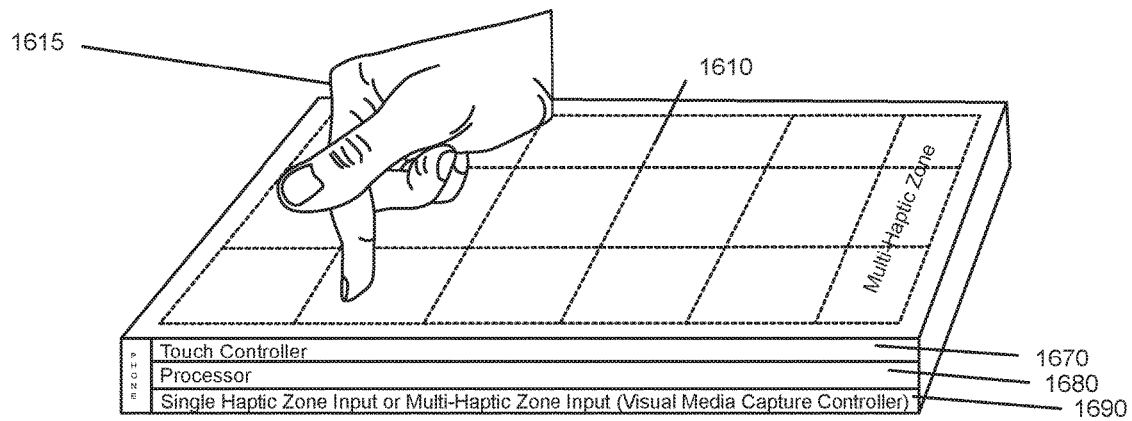
FIG. 16 illustrates an exemplary multi-haptic zone control, in accordance with an embodiment of the present invention.

FIG. 16 illustrates an exemplary multi-haptic zone control, in accordance with an embodiment of the present invention. In the present embodiment, screen display 1610 includes a multi-haptic zone. A user 1615 may engage screen display 1610 at any zone. A touch controller 1670 may be configured with a transparent interconnected grid called haptic zones, these haptic zones may offer the flexibility to control real-time visual effects, filters and animations. These areas may be specified zones located on the touch controller 1670 interface programmed to respond to specific preset actions. Preset actions may change from one haptic zone to another in real-time during the recording process of a photo or video recording. These actions may include, but not limited to, video, photo, audio effects, filters, sounds and images. Finger placement on touch controller 1670 triggers an action located within a specific haptic zone. These actions may be preset in a settings page located within an application. In some embodiments, when the presets are to default recording functionalities, users may have the ability to touch anywhere on the touch controller screen in order to record a photograph or video. Touch controller 1670 may generate a haptic contact engagement signal for processing by a visual media capture controller 1690 in conjunction with a processor 1680.

Figure 17:
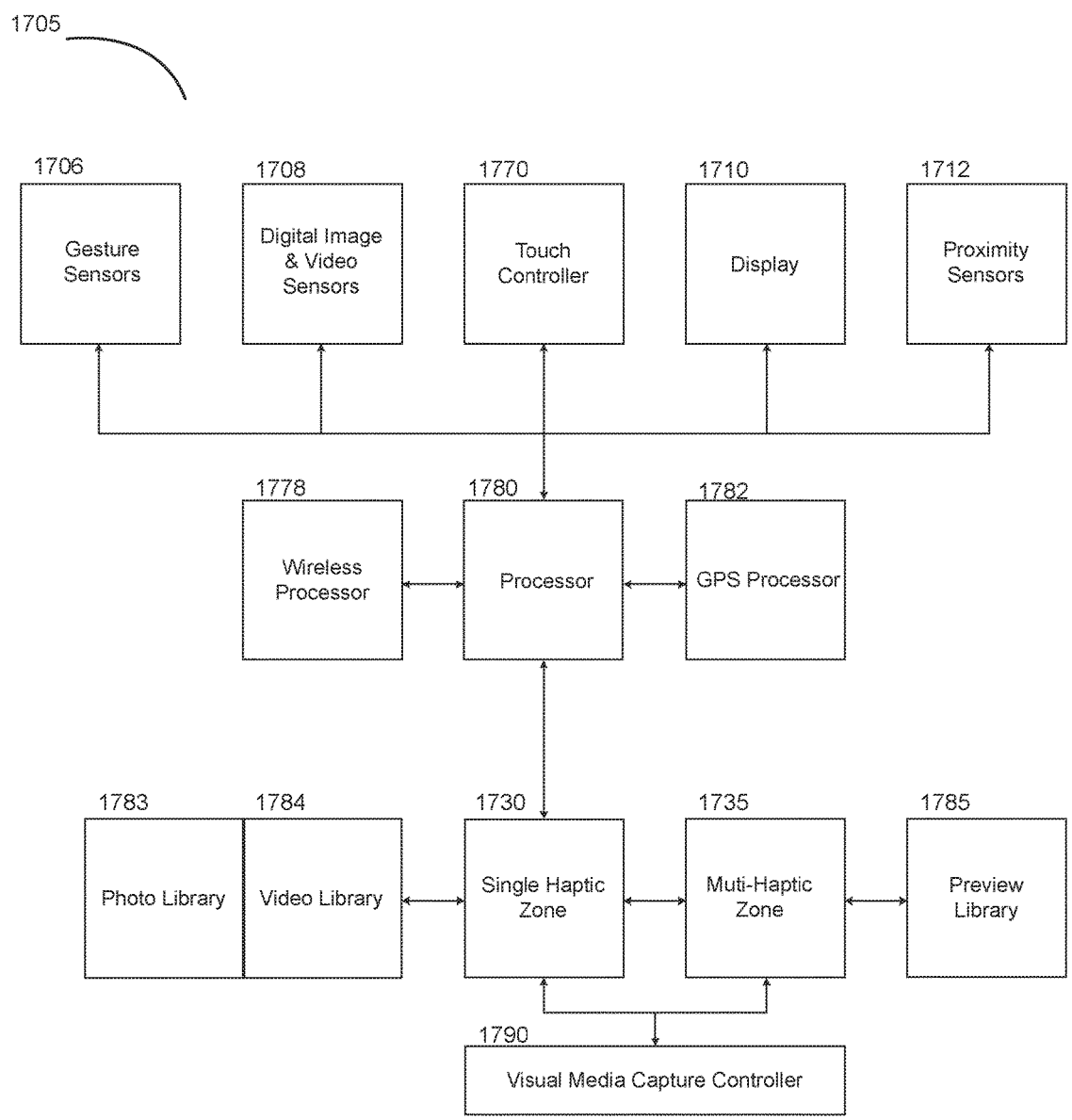
FIG. 17 illustrates an exemplary block diagram of an electronic device, in accordance with an embodiment of the present invention.
Figure 18A:
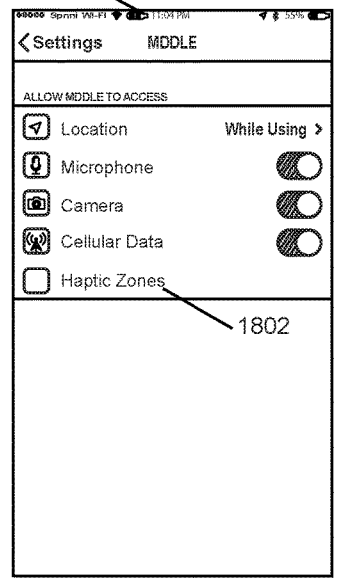
FIGS. 18A-18F illustrate an exemplary settings of an electronic device, in accordance with an embodiment of the present invention.
Figure 18B:
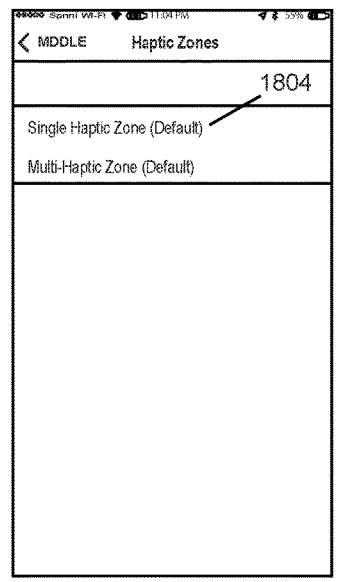
Figure 18C:
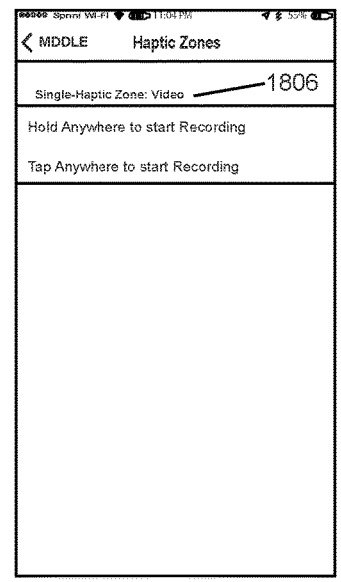
Figures 18D, 18E, 18F:
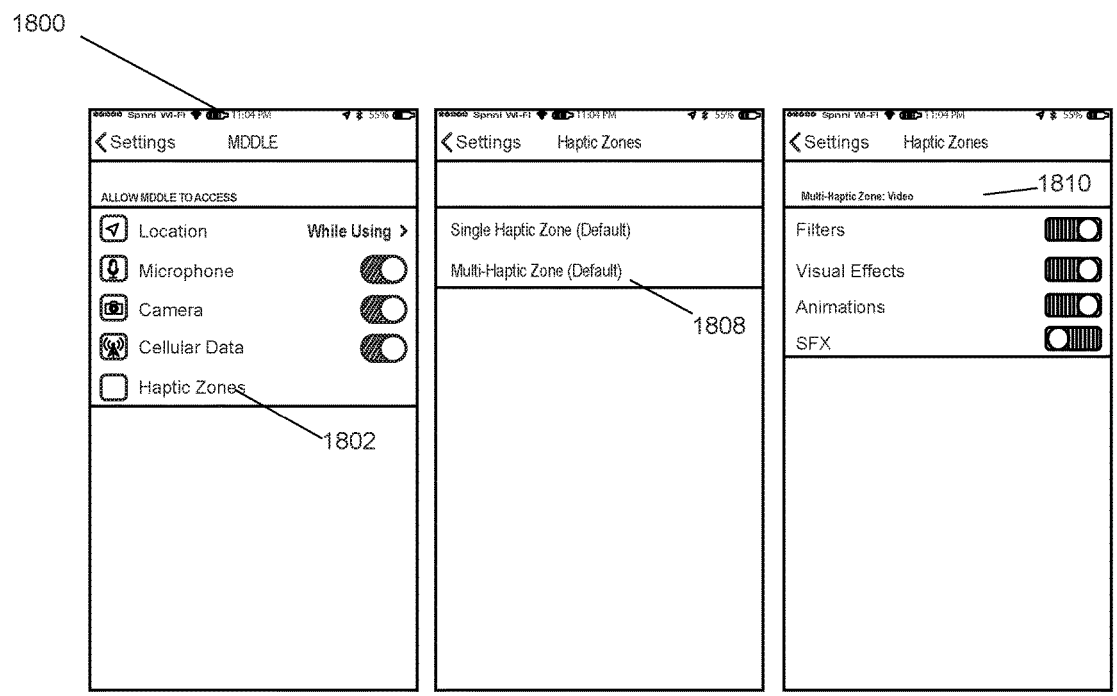

FIG. 17 illustrates an exemplary block diagram of an electronic device, in accordance with an embodiment of the present invention. In the present embodiment, electronic device 1705 may include, without limitation, gesture sensors 1706, digital image and video sensors 1708 such as digital cameras, a touch controller 1770, a display 1710, proximity sensors 1712, a processor 1780, a wireless processor 1778, and a global positioning system (GPS) processor 1782. In addition, electronic device 1705 may also include a memory for storage of photo library 1783, video library 1784, and preview library 1785. In the present embodiment, a visual media capture controller 1790 may operate in conjunction with touch controller 1770 and processor 1780 to control single haptic zone 1730 and multi-haptic zone 1735 functionalities. In some embodiments, electronic device 1705 may comprise a smartphone. In some embodiments, the memory stores visual media capture controller 1790 to implement operations of the invention. In some embodiments visual media capture controller 1790 includes executable instructions to alternately record, without limitation, a photograph or a video based upon the processing of haptic signals as they are applied to the device's haptic zones, in accordance with the teaching herein.

FIGS. 18A-18F illustrate an exemplary settings of an electronic device, in accordance with an embodiment of the present invention. In the present embodiment, settings pages 1800 may be managed to assign specific functionalities to haptic zones 1802. With a single haptic zone 1804 selected, a single haptic zone video 1806 may display options such as, but not limited to, to either hold anywhere to start a video recording or tap anywhere to start a video recording. In other embodiments, other options such as, but not limited to, circle anywhere to start recording, or swipe up, down, left or right to start recording. Also, allowing users to record video or photo by using the haptic zone technology embedded into reflective or glass surfaces as well as a variety of screen displays (LED, OLED, PLASMA, etc.), may be available. In some embodiments, the default for users may be to be able to hold anywhere to start a video recording. With a multi-haptic zone 1808 selected, a multi-haptic zone video 1810 may display options such as, but not limited to, enabling/disabling filters, visual effects, animations, an SFX. In other embodiments, other options such as, but not limited to, Gifs, Memes as well as the ability for users to modify and apply effects and filters to recorded video or photo by using the haptic zone technology embedded into reflective or glass surfaces as well as a variety of screen displays such as but not limited to LED, OLED, and PLASMA, may be available. In some embodiments, an update to an application for the electronic device may other functionalities for the haptic zones.

In some alternate embodiments, the electronic device may stream captured video recordings to a server system along with the user's selected effects/filters. The user may then play back the recording from the server system and edit the choice of effects/filters. In some alternate embodiments, the server system may save both the captured video and the video with applied effects/filters. In some alternate embodiments, the server system may be a cloud based system where the saved recording may be available to other electronic devices. In some alternate embodiments, the user may post a link to the saved recordings. In some alternate embodiments, the user may send the photograph or video recording directly from the application using email, text message, chat.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 19:
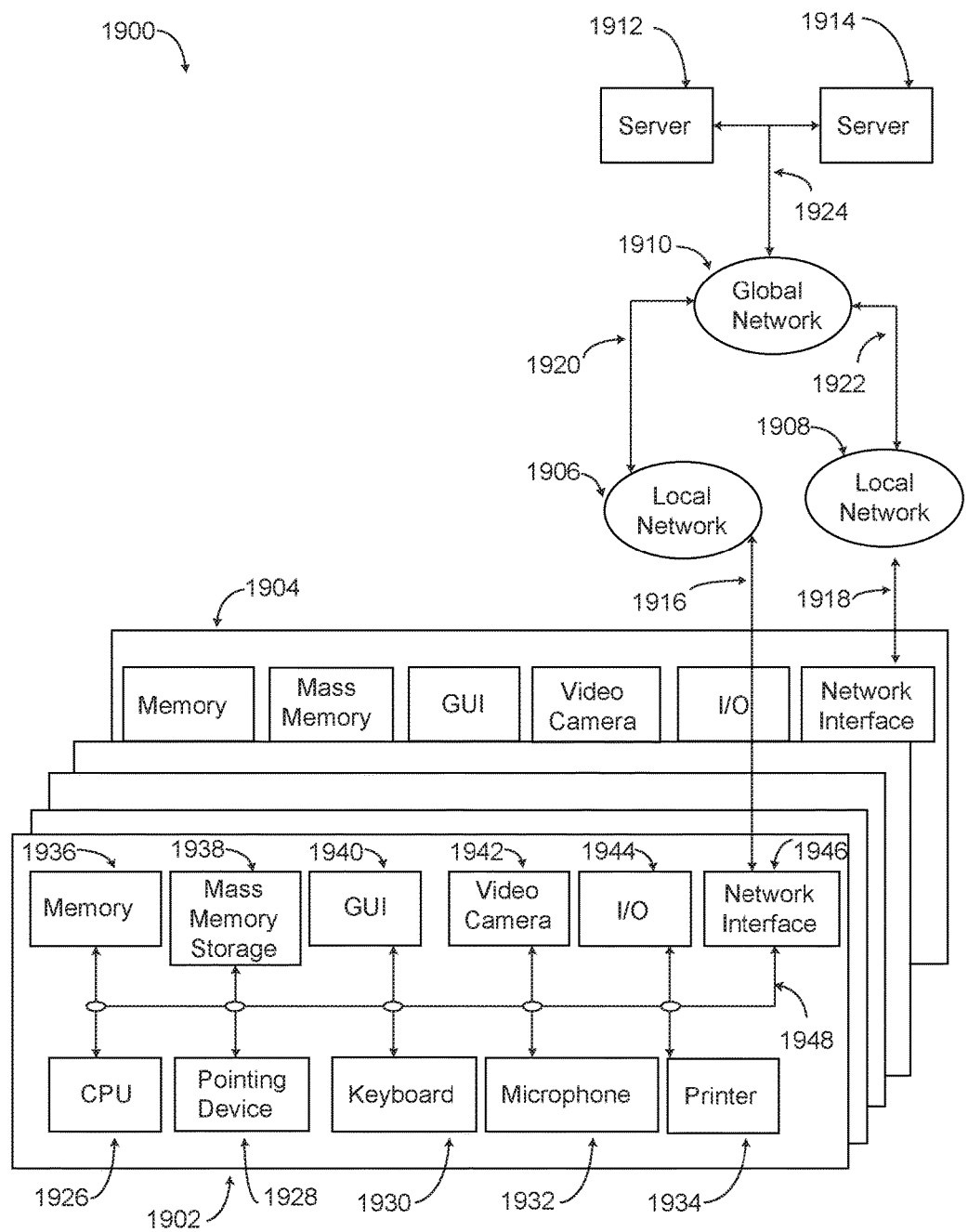
FIG. 19 is a block diagram depicting an exemplary client/server system which may be used by an exemplary web-enabled/networked embodiment of the present invention.

FIG. 19 is a block diagram depicting an exemplary client/server system which may be used by an exemplary web-enabled/networked embodiment of the present invention.

A communication system 1900 includes a multiplicity of clients with a sampling of clients denoted as a client 1902 and a client 1904, a multiplicity of local networks with a sampling of networks denoted as a local network 1906 and a local network 1908, a global network 1910 and a multiplicity of servers with a sampling of servers denoted as a server 1912 and a server 1914.

Client 1902 may communicate bi-directionally with local network 1906 via a communication channel 1916. Client 1904 may communicate bi-directionally with local network 1908 via a communication channel 1918. Local network 1906 may communicate bi-directionally with global network 1910 via a communication channel 1920. Local network 1908 may communicate bi-directionally with global network 1910 via a communication channel 1922. Global network 1910 may communicate bi-directionally with server 1912 and server 1914 via a communication channel 1924. Server 1912 and server 1914 may communicate bi-directionally with each other via communication channel 1924. Furthermore, clients 1902, 1904, local networks 1906, 1908, global network 1910 and servers 1912, 1914 may each communicate bi-directionally with each other.

In one embodiment, global network 1910 may operate as the Internet. It will be understood by those skilled in the art that communication system 1900 may take many different forms. Non-limiting examples of forms for communication system 1900 include local area networks (LANs), wide area networks (WANs), wired telephone networks, wireless networks, or any other network supporting data communication between respective entities.

Clients 1902 and 1904 may take many different forms. Non-limiting examples of clients 1902 and 1904 include personal computers, personal digital assistants (PDAs), cellular phones and smartphones.

Client 1902 includes a CPU 1926, a pointing device 1928, a keyboard 1930, a microphone 1932, a printer 1934, a memory 1936, a mass memory storage 1938, a GUI 1940, a video camera 1942, an input/output interface 1944 and a network interface 1946.

CPU 1926, pointing device 1928, keyboard 1930, microphone 1932, printer 1934, memory 1936, mass memory storage 1938, GUI 1940, video camera 1942, input/output interface 1944 and network interface 1946 may communicate in a unidirectional manner or a bi-directional manner with each other via a communication channel 1948. Communication channel 1948 may be configured as a single communication channel or a multiplicity of communication channels.

CPU 1926 may be comprised of a single processor or multiple processors. CPU 1926 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1936 is used typically to transfer data and instructions to CPU 1926 in a bi-directional manner. Memory 1936, as discussed previously, may include any suitable computer-readable media, intended for data storage, such as those described above excluding any wired or wireless transmissions unless specifically noted. Mass memory storage 1938 may also be coupled bi-directionally to CPU 1926 and provides additional data storage capacity and may include any of the computer-readable media described above. Mass memory storage 1938 may be used to store programs, data and the like and is typically a secondary storage medium such as a hard disk. It will be appreciated that the information retained within mass memory storage 1938, may, in appropriate cases, be incorporated in standard fashion as part of memory 1936 as virtual memory.

CPU 1926 may be coupled to GUI 1940. GUI 1940 enables a user to view the operation of computer operating system and software. CPU 1926 may be coupled to pointing device 1928. Non-limiting examples of pointing device 1928 include computer mouse, trackball and touchpad. Pointing device 1928 enables a user with the capability to maneuver a computer cursor about the viewing area of GUI 1940 and select areas or features in the viewing area of GUI 1940. CPU 1926 may be coupled to keyboard 1930. Keyboard 1930 enables a user with the capability to input alphanumeric textual information to CPU 1926. CPU 1926 may be coupled to microphone 1932. Microphone 1932 enables audio produced by a user to be recorded, processed and communicated by CPU 1926. CPU 1926 may be connected to printer 1934. Printer 1934 enables a user with the capability to print information to a sheet of paper. CPU 1926 may be connected to video camera 1942. Video camera 1942 enables video produced or captured by user to be recorded, processed and communicated by CPU 1926.

CPU 1926 may also be coupled to input/output interface 1944 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

CPU 1926 optionally may be coupled to network interface 1946 which enables communication with an external device such as a database or a computer or telecommunications or internet network using an external connection shown generally as communication channel 1916, which may be implemented as a hardwired or wireless communications link using suitable conventional technologies. With such a connection, CPU 1926 might receive information from the network, or might output information to a network in the course of performing the method steps described in the teachings of the present invention.

Finally, the haptic zone technology is capable of being incorporated and used as a software or a hardware chip. This chip may be able to be installed and embedded into any reflective, glass or clear surface, screen or monitor display. The haptic zone technology has the ability to be modified based upon the administrators desires. Any haptic zone is capable of being configured according the needs of the administrator; therefore, using any gesture to snap a photo or record a video is allowed. Any haptic zone or multi-haptic zone is capable of being configured to apply any sort of effect, filter, animation, SFX, color configuration to any recorded image or video, as well as any live recorded video or photo. For example, haptic zone technology could be used in mirrors around the world. Retail Stores like Macy's could place mirrors containing the haptic zone technology chip within all of their fitting rooms. When a customer is trying on a new dress, the haptic zone technology would allow a customer to simply try on one dress and rely on the haptic zone technology chip embedded within the mirror to change the color of the dress. She simply would hold her finger against the mirror to activate the recording of herself in the mirror (camera is embedded within), as she is recording she is able to rely on the multi haptic zone technology to change the color of her dress live or post recorded. Another example, is the embedding of a haptic zone technology chip within television sets and screen displays (OLED, LED, PLASMA) that allow users from around the world to touch and hold the surface of their television unit in order to activate a video recording or photo (camera embedded within the tv). The user would then be able to alter or apply effects and filters to the video recording live or post recording.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing image recording according to the present invention will be apparent to those skilled in the art. Various aspects of the invention have been described above by way of illustration, and the specific embodiments disclosed are not intended to limit the invention to the particular forms disclosed. The particular implementation of the image recording may vary depending upon the particular context or application. By way of example, and not limitation, the image recording described in the foregoing were principally directed to activating a recording on a mobile device implementation; however, similar techniques may instead be applied to activating data recordings on electronic devices and test equipment, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system comprising:
a processor;
a digital image sensor, wherein said digital image sensor is configured to capture a visual media in conjunction with said processor;
a screen display, said screen display is configured to present said captured visual media from said digital image sensor, in which said screen display comprising at least a plurality of interconnected grids, wherein said at least a plurality of interconnected grids is configured to at least function as a single haptic zone or a multiple individual haptic zones;
a touch controller, said touch controller comprising a touch controller interface that is configured to identify, at least one of, a haptic contact engagement, a haptic contact signal, and a haptic contact gesture detected on said single haptic zone or at least one of said multiple individual haptic zones;
a visual media capture controller configured to at least alternately capture said visual media as a photographic image or record said visual media as a video image based upon the number of times or the process with which said at least one of a haptic contact engagement, signal or gesture is detected on said single haptic zone or at least one of said multiple individual haptic zones; and
wherein said single haptic zone is further configured to toggle into said multiple individual haptic zones once said photographic image capture or video image recording is activated.

2. The system of claim 1, in which said digital image sensor comprising at least a camera, wherein said single haptic zone and each of said multiple individual haptic zones are configured to control a functionality of said camera.

3. The system of claim 1, wherein said single haptic zone or each of said multiple individual haptic zones is configured to apply visual effects or filters based upon said at least one or more pre-specified gestures or series of gestures.

4. The system of claim 1, wherein said multiple individual haptic zones activation occurs when said at least one of said haptic contact engagement, haptic contact signal, and haptic contact gesture is detected on said single haptic zone.

5. The system of claim 4, wherein said detecting of at least one of said haptic contact engagement, haptic contact signal, and haptic contact gesture comprises detecting a holding or pressing action against said single haptic zone for a predetermined period of time, which in turn, trigger said video image recording functionality.

6. The system of claim 5, further comprising a video library, wherein said visual media capture controller stores said recorded video in said video library, wherein said visual media capture controller is further configured to be operable to invoke a video image preview mode.

7. The system of claim 4, wherein said detecting of at least one of said haptic contact engagement, haptic contact signal, and haptic contact gesture comprises detecting at least two tapping actions on said single haptic zone within a predetermined period of time, which in turn, trigger said photographic image capture functionality.

8. The system of claim 7, further comprising a photographic image library, wherein said visual media capture controller stores said captured photographic image in said photographic image library, wherein said visual media capture controller is further configured to be operable to invoke a photographic image preview mode.

9. The system of claim 4, wherein said detecting of at least one of said haptic contact engagement, haptic contact signal, and haptic contact gesture comprises detecting a single tap action within a predetermined period of time is configured to toggle said single haptic zone and said multiple individual haptic zones.

10. The system of claim 1, further comprising;
a power control circuit; and
a global positioning processor connected to said processor.

11. The system of claim 1, further comprising a non-transient computer readable storage medium configured to store executable instructions, wherein said executable instructions comprising;
processing said haptic contact signal detected from said single haptic zone or at least one of said multiple individual haptic zones;
focusing on an object based upon a detected first haptic contact signal;
recording said photographic image based upon a detected second haptic contact signal; and
recording said video image based on a detected pressing or holding action on said single haptic zone or at least one of said multiple individual haptic zones.

12. The system of claim 1, further comprising:
a gyroscope device, an accelerometer device, a proximity sensor, a compass device, an audio sensor, and a gesture sensor.

13. The system of claim 12, wherein said visual media capture controller comprising an auto visual media capture controller, wherein said auto visual media capture controller is configured to alternately record said visual media as a photographic image and a video image based upon a detected change of at least one of said system or image orientation, proximity, and stability within a predetermined period of time.

14. The system of claim 1, in which said touch controller further comprising a screen size user interface touch controller, wherein a detected pressure against said screen size user interface touch controller is configured to initiate and activate a video recording process, said screen size user interface touch controller comprising a colored border, wherein said colored border is configured to illuminate to notify a user of said video recording process.

15. The system of claim 14, wherein said screen size user interface touch controller is configured to focus said digital image sensor on a specified object when touched quickly anywhere once on said screen size user interface touch controller.

16. A system comprising:
means for processing a visual media capture or recording;
means for capturing or recording said visual media in conjunction with said means for processing;
means for presenting said captured or recorded visual media from said means for capturing;
means for forming alternatively, at least a single haptic zone and a multiple individual haptic zones on said means for presenting;
means for identifying, at least one of, a haptic contact engagement, a haptic contact signal, and a haptic contact gesture detected on said single haptic zone and at least one of said multiple individual haptic zones;
means for alternately recording said visual media as a photographic image or as a video image based upon the number of times or the process with which at least one of said haptic contact engagement, signal and gesture is detected on said single haptic zone or at least one of said multiple individual haptic zones; and
means for toggling between said single haptic zone and multiple individual haptic zones, wherein said single haptic zone is further configured to toggle into said multiple individual haptic zones once said photographic image capture or video image recording is activated.

17. A system comprising:
a processor;
a digital image sensor, wherein said digital image sensor is configured to capture a visual media in conjunction with said processor;
a screen display, said screen display is configured to present said captured visual media from said digital image sensor, in which said screen display comprising at least a plurality of interconnected grids, wherein said at least a plurality of interconnected grids is configured to at least function as a single haptic zone and, alternatively, a multiple individual haptic zones;
a touch controller, said touch controller comprising a touch controller interface that is configured to identify, at least one of, a haptic contact engagement, a haptic contact signal, and a haptic contact gesture detected on said single haptic zone or at least one of said multiple individual haptic zones; and
a visual media capture controller configured to at least alternately capture said visual media as a photographic image or record said visual media as a video image based upon an identified number of times or a process with which said at least one of a haptic contact engagement, signal or gesture is detected on said single haptic zone or at least one of said multiple individual haptic zones, wherein said single haptic zone or each of said multiple individual haptic zones is configured to be operable for activating said photographic image capture or video image recording based on said identified number of times or process; and
wherein said single haptic zone is configured to toggle into said multiple individual haptic zones based on said activation of said photographic image capture or video image recording.

* * * * *